(12) United States Patent
Palmquist

(10) Patent No.: US 10,703,537 B2
(45) Date of Patent: Jul. 7, 2020

(54) ORGANIZATIONAL STORAGE TRAY

(71) Applicant: Walmart Apollo, LLC, Bentonville, AR (US)

(72) Inventor: Jamie Palmquist, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/603,424

(22) Filed: May 23, 2017

(65) Prior Publication Data

US 2018/0339808 A1 Nov. 29, 2018

(51) Int. Cl.
| | |
|---|---|
| *B65D 1/36* | (2006.01) |
| *B65D 25/06* | (2006.01) |
| *B65D 25/10* | (2006.01) |
| *B65D 25/04* | (2006.01) |
| *B65D 1/24* | (2006.01) |
| *A47J 47/16* | (2006.01) |
| *B65D 25/24* | (2006.01) |
| *B65D 1/42* | (2006.01) |
| *B65D 25/14* | (2006.01) |
| *B65D 25/34* | (2006.01) |

(52) U.S. Cl.
CPC .............. *B65D 25/06* (2013.01); *A47J 47/16* (2013.01); *B65D 1/24* (2013.01); *B65D 1/36* (2013.01); *B65D 25/04* (2013.01); *B65D 25/10* (2013.01); *B65D 25/106* (2013.01); *B65D 25/24* (2013.01); *B65D 25/14* (2013.01); *B65D 25/34* (2013.01)

(58) Field of Classification Search
CPC .......... B65D 25/00; B65D 1/36; B65D 25/10; B65D 25/14; B65D 1/24; B65D 1/34; A47J 47/16

USPC .................. 220/555, 507, 532, 572; 206/519
See application file for complete search history.

(56) References Cited

U.S. PATENT DOCUMENTS

| | | | | |
|---|---|---|---|---|
| 4,191,291 A | * | 3/1980 | Brown | A61C 19/02 206/369 |
| 4,648,524 A | * | 3/1987 | Ackermann | A47B 88/90 220/507 |
| 4,887,790 A | * | 12/1989 | Wilkinson | A61J 3/06 249/52 |
| 4,947,991 A | * | 8/1990 | Snell | A47B 13/16 206/427 |
| 4,989,846 A | * | 2/1991 | Quinn | A47G 23/06 269/54.5 |
| 5,267,389 A | * | 12/1993 | Chumley | B65D 1/24 264/544 |
| 5,366,069 A | * | 11/1994 | Seidner | A45C 1/10 206/0.84 |
| 5,409,127 A | * | 4/1995 | Stratford | B65D 1/30 220/23.4 |

(Continued)

OTHER PUBLICATIONS

Kim, "International Search Report", International Patent Application No. PCT/US18/28177, dated May 31, 2018, 4 pages.

(Continued)

*Primary Examiner* — J. Gregory Pickett
*Assistant Examiner* — Niki M Eloshway

(57) ABSTRACT

Examples of the disclosure provide a storage apparatus comprising a substantially rigid, formed tray having a plurality of cells configured to provide separate storage compartments. The storage apparatus has a height, width, and depth configured for implementation within a standard sized cabinetry drawer.

20 Claims, 13 Drawing Sheets

(56) References Cited

U.S. PATENT DOCUMENTS

| | | | | |
|---|---|---|---|---|
| 5,419,451 A | * | 5/1995 | Bitel, Jr. | B65D 1/36 206/508 |
| D383,607 S | * | 9/1997 | Whitlock | D3/305 |
| 5,915,561 A | * | 6/1999 | Lorenzana | A47G 23/0608 206/562 |
| 5,921,423 A | * | 7/1999 | Howell | A47G 23/06 206/508 |
| 2002/0121520 A1 | * | 9/2002 | Govrik | B65D 1/36 220/500 |
| 2004/0245254 A1 | * | 12/2004 | Rosenberg | A47B 88/90 220/507 |
| 2008/0223801 A1 | * | 9/2008 | Krempa | A47B 75/00 211/71.01 |
| 2011/0253587 A1 | * | 10/2011 | Pinkstone | B65D 5/2038 206/557 |
| 2012/0037520 A1 | * | 2/2012 | Cline | A47B 41/00 206/214 |
| 2012/0292327 A1 | * | 11/2012 | Carey | A45C 11/20 220/592.2 |
| 2015/0021329 A1 | * | 1/2015 | Darmon | B65D 7/10 220/345.1 |
| 2016/0345784 A1 | * | 12/2016 | Johnson | A47B 81/04 |

OTHER PUBLICATIONS

Kim, "Written Opinion", International Patent Application No. PCT/US18/28177, dated May 31, 2018, 5 pages.

\* cited by examiner

ORGANIZATIONAL STORAGE TRAY

BACKGROUND

Items are often stored in drawers or cabinets, where repetitive access can result in disorganization. Storage solutions are utilized to contain items in discreet quantities to make access and location of the items more efficient. However, some storage solutions are generic and may provide inadequate sizing for the items desired for storage, while other storage solutions are customized yet may be cost-prohibitive and have limited use beyond their customized intent.

SUMMARY

Examples of the disclosure provide a storage apparatus comprising a substantially rigid, formed tray having a plurality of cells. The plurality of cells is configured to provide separate storage compartments. The storage apparatus has a height, width, and depth configured for implementation within a standard sized cabinetry drawer.

In another aspect, a storage apparatus is provided comprising a substantially rigid, formed tray having a plurality of cells and a plurality of pegs. The plurality of cells is configured to provide separate storage compartments. The plurality of pegs is configured to provide a surface around which an item is placed. The storage apparatus has a height, width, and depth configured for implementation within a standard sized cabinetry drawer.

In yet another aspect, a storage apparatus is provided comprising a substantially rigid, formed tray having eight individual cells. The eight individual cells are configured to provide eight separate storage compartments for canning equipment. The storage apparatus has a height, width, and depth configured for implementation within a standard sized kitchen cabinetry drawer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure provide a storage apparatus for organizing and containing a plurality of items in separate, discreet compartments. The storage apparatus may be implemented as a tray having a number of compartments, or cells, open from the top to receive storage items and enclosed from the bottom and four sides to contain the received items. The separate compartments may be sized and/or spaced to accommodate specific sized items. The storage apparatus is designed with a height, width, and depth to fit within a standard sized cabinetry drawer, such as a kitchen drawer for example. In this way, the storage apparatus may be used to organize and contain multiple items within separate compartments within a larger storage drawer in order to provide efficient location of the items stored within.

Aspects of the disclosure provide for a storage tray that is durable, dishwasher safe, and fits within a standard drawer size to provide multiple use opportunities. In some examples, the storage tray has fixed, evenly spaced compartments pre-configured at a determined size to accommodate a specific class or category of items. In other examples, the storage tray has modular compartments, modifiable in size by adjusting a position of one or more removeable dividers inserted into a selection of slots alongside the outer wall of the tray and an interior fixed divider to provide varying sized cells. In still other examples, the storage tray has a combination of fixed and/or modular compartments and a plurality of fixed and/or removeable pegs implemented across the tray.

Figure 1:
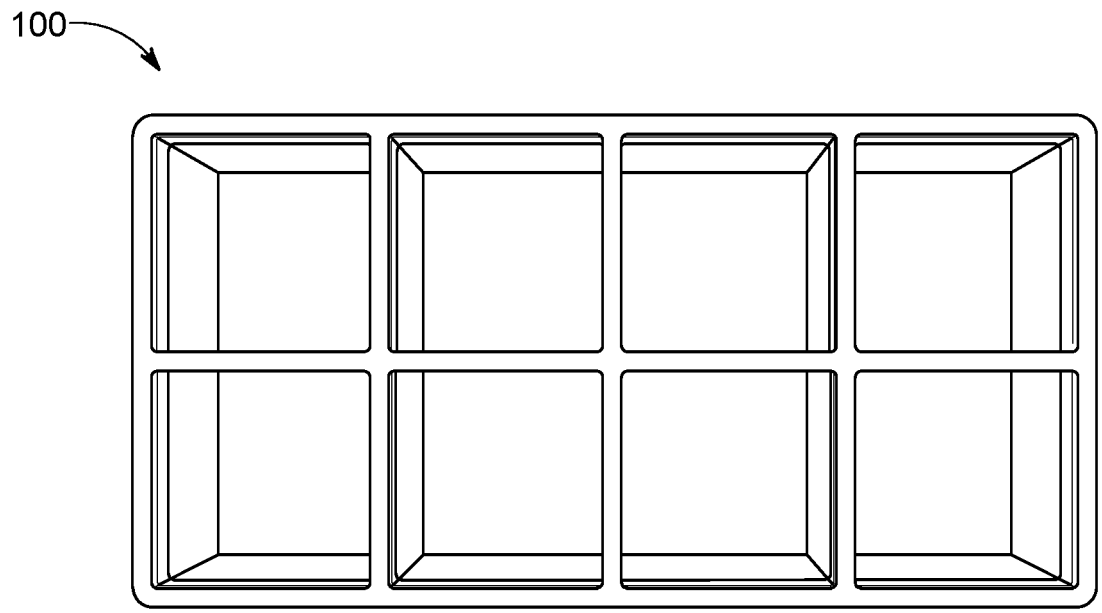
FIG. 1 is a block diagram illustrating an example top perspective view of a storage apparatus.

FIG. 1 is a block diagram illustrating an example top perspective view of a storage apparatus. Storage apparatus 100 is an exemplary implementation of a substantially rigid, formed tray having eight individual cells, the eight individual cells configured to provide eight separate storage compartments for items, such as canning equipment for example. Storage apparatus 100 has a height, width, and depth configured for implementation within a standard sized cabinetry drawer, such as a kitchen drawer for example. In one implementation, the dimensions of storage apparatus 100 may be 17.3 inches width (W)×2.6 inches height (H)×8.9 inches depth (D) (17.3"(W)×2.6" (H)×8.9"(D)). In other examples, the dimensions may have varying ranges of height, width, and/or depth while still providing overall dimensions that allow for insertion of the storage apparatus into a standard sized drawer. In these examples, a standard sized drawer includes any cabinet drawer assembled according to standard sizes in the industry. For example, kitchen drawers typically have standardized parts. Most kitchen drawers use the same size runners, and most even have similar sizes. Standard building materials are typically used such as plywood, or other lumber solids. Most production kitchen cabinet drawers are assembled using simple joints and common staple guns or other fasteners. They are simple boxes with wooden fronts having a standardized height, width, and depth. For example, a standardized kitchen drawer typically has a box length of twenty inches from front to back. Although the dimensions of storage apparatus 100 may be configured for insertion or implementation within a drawer, storage apparatus 100 is not limited to use within a drawer. Storage apparatus 100 may be implemented any where that containment and organization of items is desired, including without limitation, a shelf, cabinet, counter, closet, or any other suitable location.

Storage apparatus 100, as depicted in this example, includes eight cells or storage compartments offering separate storage slots for items. These cells or storage compartments may be sized to accommodate specific items. For example, a storage tray for use in organizing and storing canning equipment, such as lids and rings associated with canning jars, may include cells that are sized to accommodate the dimensions of standard sized canning lids and canning rings. In the example of canning equipment, there may be two standard sizes associated with rings and lids in the canning industry, a regular mouth jar and a wide mouth jar. In some examples, the cells are preconfigured with a size to accommodate the diameter of wide mouth canning lids and wide mouth canning rings, such that either of the standard size canning equipment may be stored within one or more cells of the storage apparatus 100. In other examples, one or more cells may be sized to accommodate custom sizes, such as larger or smaller lids or rings, or other equipment having particular dimensions.

In some examples, the cells of storage apparatus 100 are configured to provide equally sized compartments. In other examples, the cells of storage apparatus 100 are configured to provide varying sized compartments. In some implementations, the cells of storage apparatus 100 are fixed in size, while in other implementations the cells are modifiable in size. Storage apparatus 100 may be fully adjustable, partially adjustable, or non-adjustable in various implementations.

The cells of storage apparatus 100 may be evenly spaced in such a way as to use the least amount of material possible to provide a lightweight tray while still maintaining adequate rigidity and durability. Storage apparatus 100 in these examples is a formed tray, having substantial rigidity to maintain shape and function of providing separate storage compartments for containment and storage of one or more items. Storage apparatus 100 may be configured using any type of material, including, without limitation, injection molded plastic, polypropylene, acrylic, wood, metal, or any other suitable material. In some examples, an additional coating material may be applied over the material used to form the tray, such as a sealant and/or protectant. A coating material applied to a surface of the substantially rigid formed tray may provide a moisture barrier for a material of the substantially rigid formed tray in these examples.

In one example, storage apparatus 100 is comprised of injection molded plastic that is BPA-free to meet Federal guidelines for food safety. In this example, storage apparatus 100 is dishwasher safe, and may be comprised of a material that is mold-resistant and/or bacteria-resistant. This provides a storage tray that is easily cleaned and safe for use with food-related items.

In another example, storage apparatus 100 is comprised of a wood material and may further include a coating, sealant, and/or protectant layer over the surface of the wood material that provides water resistance. For example, a polyurethane coating may be applied to seal the wood material of the tray.

In still another example, storage apparatus 100 is comprised of a metal material and may further include a coating, sealant, and/or protectant layer or finish over the surface of the metal material that provides water resistance and/or rust resistance. For example, a powder coating or clear coat protectant may be used, which may also provide a tray that is dishwasher safe in some examples.

Figure 2:
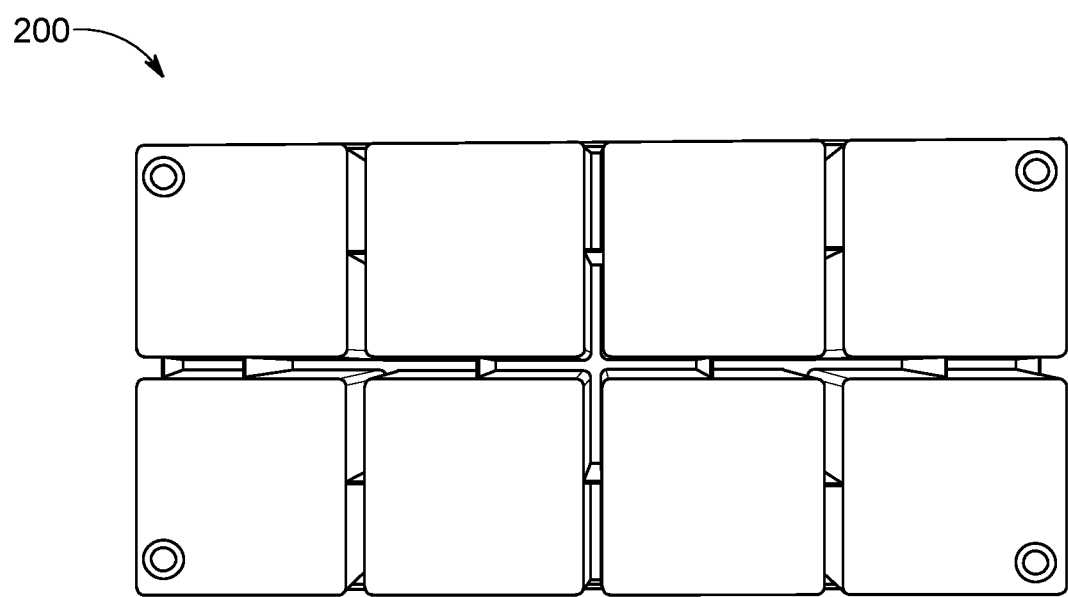
FIG. 2 is a block diagram illustrating an example bottom perspective view of a storage apparatus.

FIG. 2 is a block diagram illustrating an example bottom perspective view of a storage apparatus. Storage apparatus 200 may be an illustrative example of a bottom view of storage apparatus 100.

Storage apparatus 200 may further include one or more feet disposed and/or affixed along a bottom surface of the tray. The one or more feet may provide a slip resistance property to storage apparatus 200, providing resistance to movement along or across a surface on which storage apparatus 200 is implemented. In some examples, the one or more feet may be comprised of a rubber or rubberized material and affixed to the bottom surface of the tray after the tray is formed or molded. In other examples, the one or more feet may be implemented as protrusions of the material used to from the tray along the bottom surface of the tray and may be configured during the molding process of the material. For example, the tray may be comprised of a substantially rigid rubberized plastic that provides slip resistance by virtue of the nature of the material used to form the tray.

In this illustrative example, storage apparatus 200 includes four feet disposed along the bottom surface of the tray, such as on each of the four corners of the tray. In other examples, one or more feet may be disposed across the bottom of the tray in any particular pattern and/or number.

Figure 3:
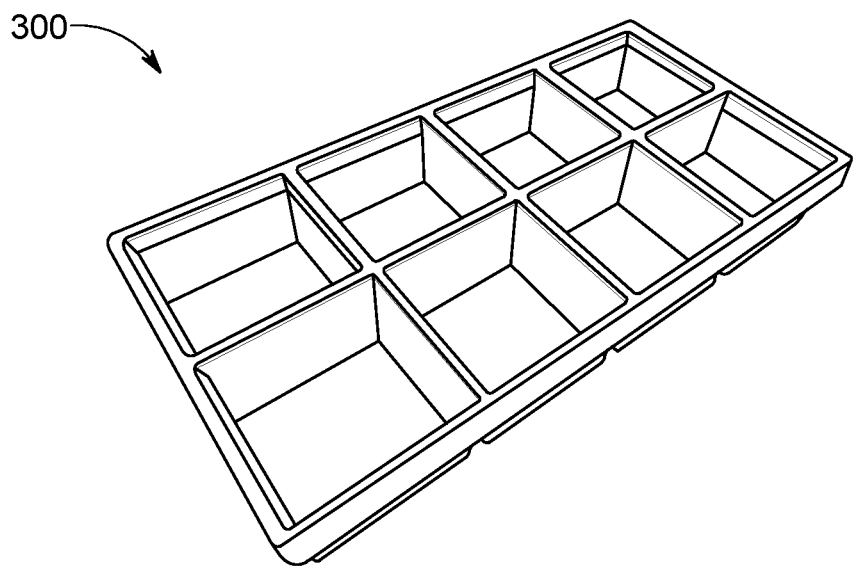
FIG. 3 is a block diagram illustrating an example top angled perspective view of a storage apparatus.

FIG. 3 is a block diagram illustrating an example top angled perspective view of a storage apparatus. Storage apparatus 300 may be an illustrative example of a isometric perspective view of storage apparatus 100 and/or storage apparatus 200.

Figure 4:
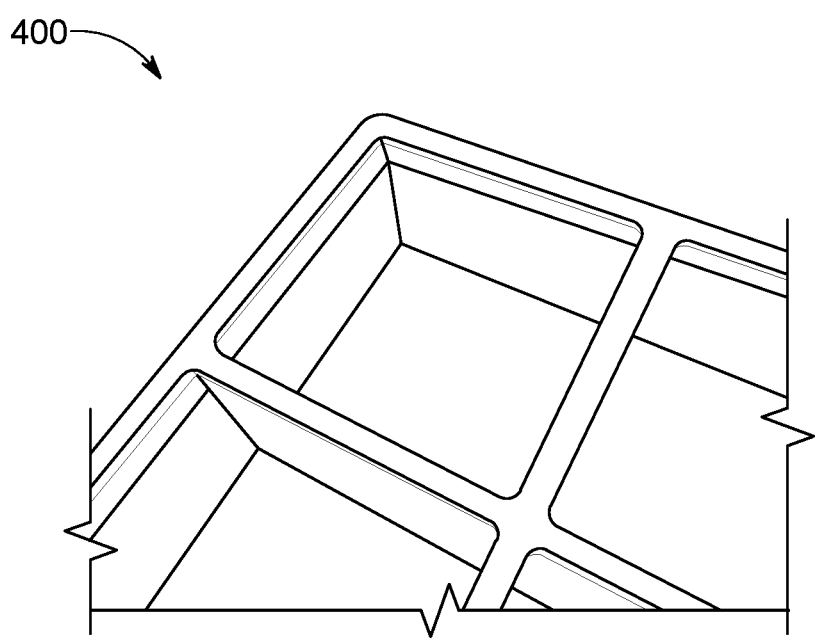
FIG. 4 is a block diagram illustrating an example exploded perspective view of an individual cell of a storage apparatus.

FIG. 4 is a block diagram illustrating an example exploded isometric perspective view of an individual cell of a storage apparatus. Storage apparatus 400 may be an illustrative example of at least one cell or storage compartment of storage apparatus 100, storage apparatus 200, and/or storage apparatus 300. As depicted in this example, an individual cell, or storage compartment, of the substantially rigid, formed tray having a plurality of cells comprises four walls and a floor surface perpendicularly adjacent to the four walls, providing an opening parallel from the floor surface. In other words, in this example an open cube shape is formed where the four walls and bottom surface are implemented as a continuous surface open to the top to provide access for inserting and removing items into the cell. In this example, the four walls are stationary or fixed, preconfigured to provide a specific dimension for the cell or storage compartment. In other examples, one or more of the four walls may be moveable and/or adjustable.

Figure 5:
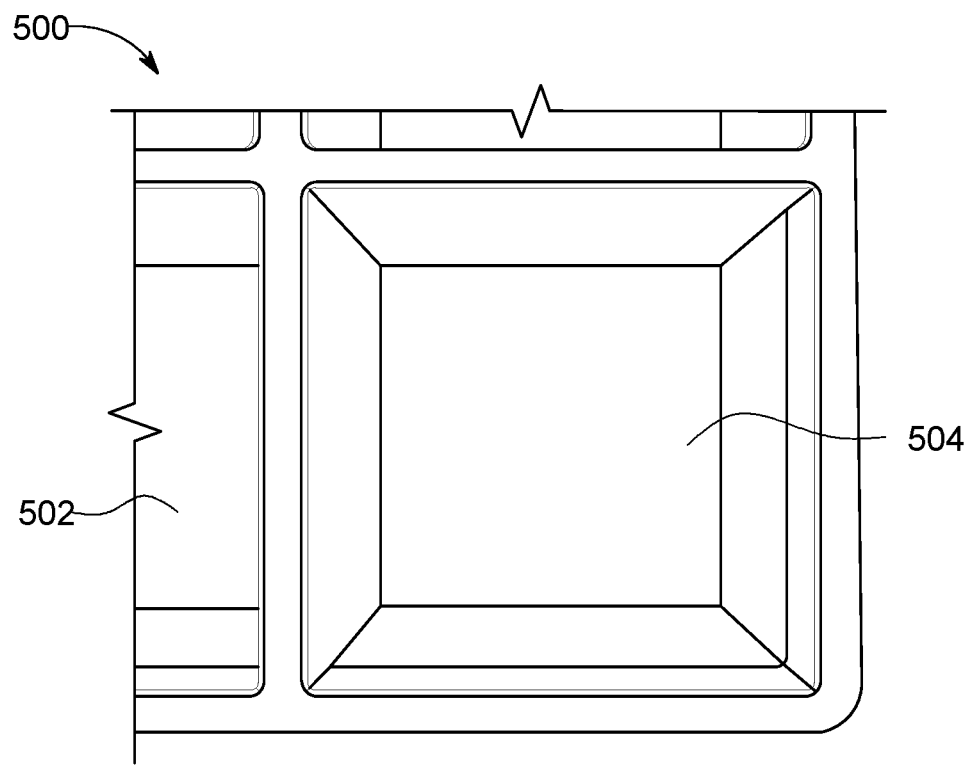
FIG. 5 is a block diagram illustrating an example exploded top perspective view of an individual cell of a storage apparatus.

FIG. 5 is a block diagram illustrating an example exploded top perspective view of an individual cell of a storage apparatus. Storage apparatus 500 may be an illustrative example of at least a portion of storage apparatus 100, storage apparatus 200, and/or storage apparatus 300.

Storage apparatus 500 includes a partial view of individual cell 502 and view of individual cell 504. Individual cell 504 may be an illustrative example of an individual cell as depicted and described in storage apparatus 400 in FIG. 4.

Figure 6:
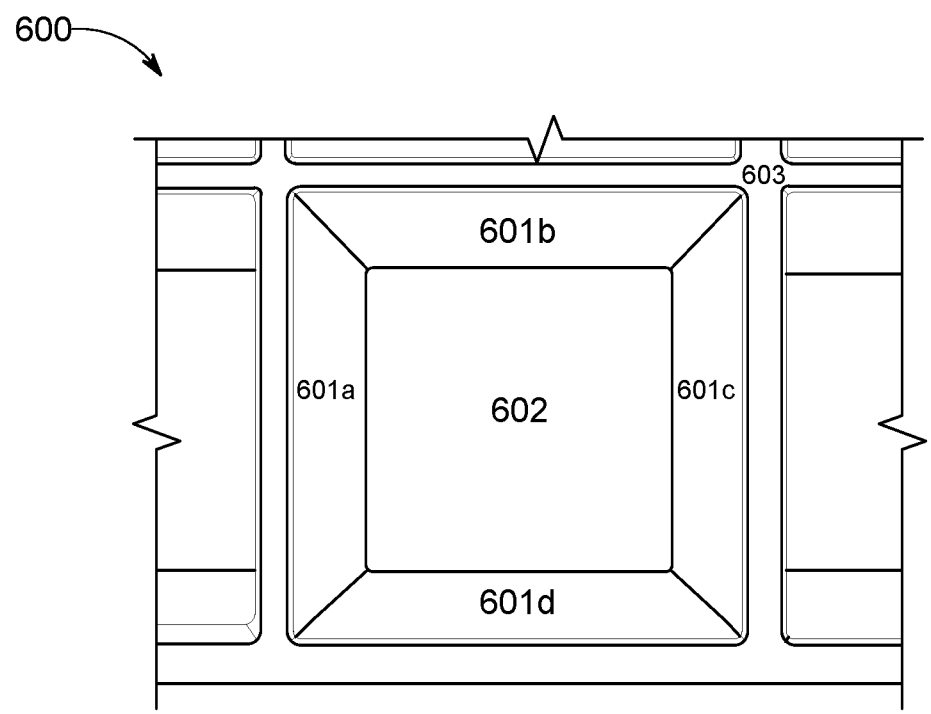
FIG. 6 is a block diagram illustrating an example exploded top perspective view of an individual cell of a storage apparatus.

FIG. 6 is a block diagram illustrating an example exploded top perspective view of an individual cell of a storage apparatus. Storage apparatus 600 may be an illustrative example of at least a portion of storage apparatus 100, storage apparatus 200, and/or storage apparatus 300. Storage apparatus 600 includes four walls (601a-601d) and a floor surface 602 perpendicularly adjacent to the four walls (601a-601d).

Figure 7:
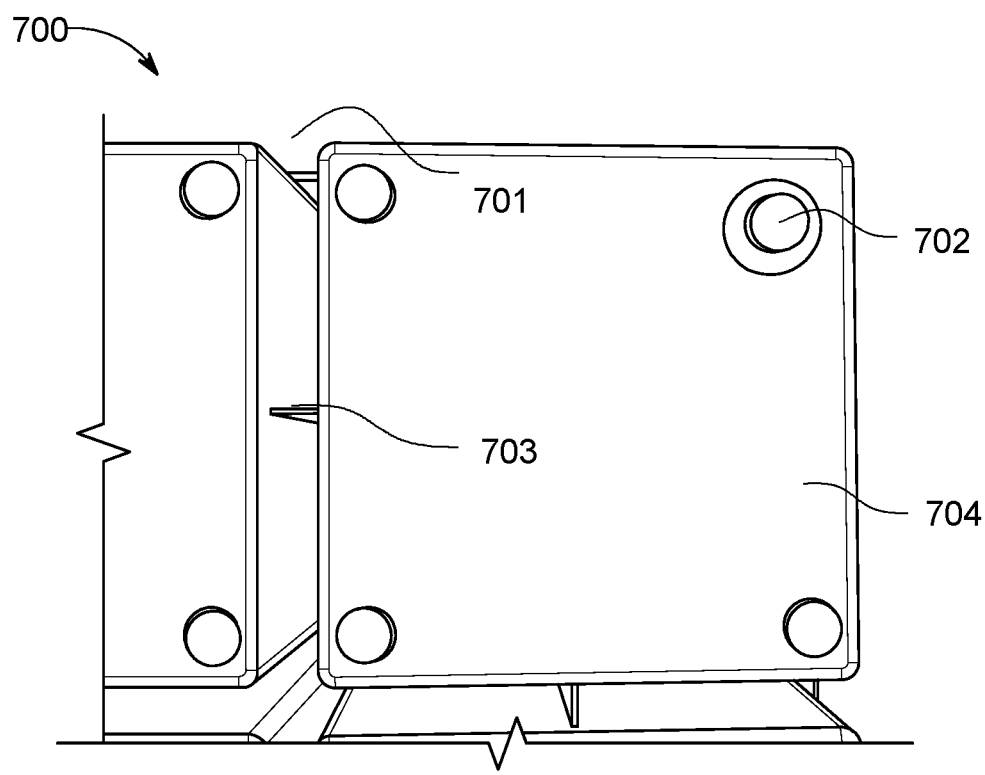
FIG. 7 is a block diagram illustrating an example exploded bottom perspective view of an individual cell of a storage apparatus.

FIG. 7 is a block diagram illustrating an example exploded bottom perspective view of an individual cell of a storage apparatus. Storage apparatus 700 may be an illustrative example of at least a portion of storage apparatus 100, storage apparatus 200, and/or storage apparatus 300.

Storage apparatus 700 includes slip-resistant foot 702 implemented on bottom surface 704 of an individual cell. Slip-resistant foot 702 may be a rubberized material that provides traction and/or friction against a surface. Slip-resistant foot 702 may be affixed to bottom surface 704 in a preconfigured well formed into the bottom surface of the tray to accommodate slip-resistant foot 702 after the tray is molded and/or formed. As depicted in this example, slip-resistant foot 702 may be affixed into the well or indention formed into bottom surface 704 using an adhesive or other binding material. Storage apparatus 700 also includes a space 701 between the cells and a tab 703 located inside space 703 connecting a first cell to a second cell.

Figure 8:
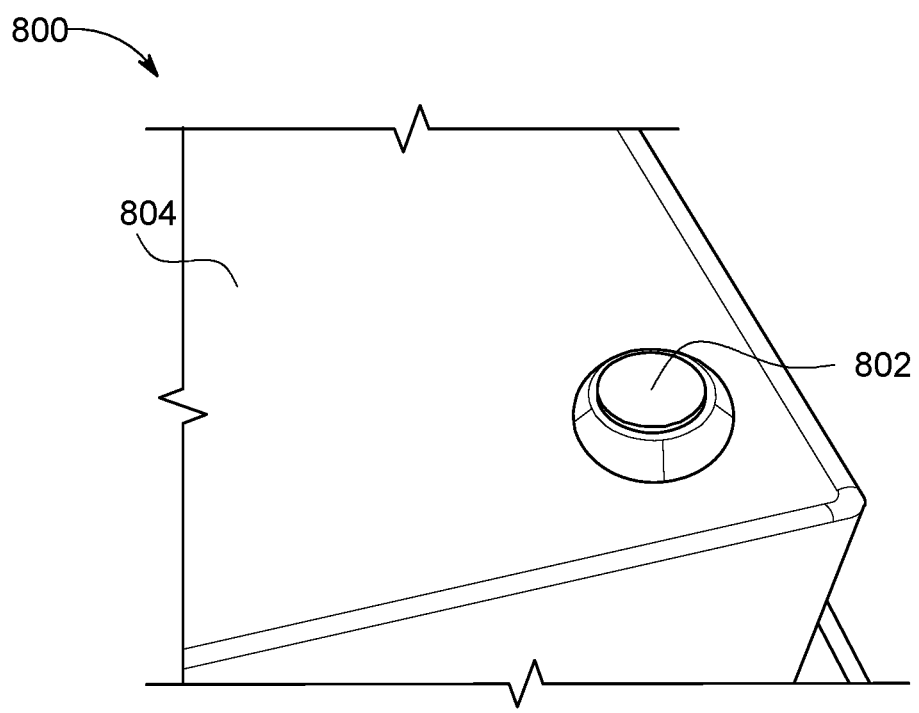
FIG. 8 is a block diagram illustrating an example exploded bottom perspective view of an individual foot of a storage apparatus.

FIG. 8 is a block diagram illustrating an example exploded bottom isometric perspective view of an individual foot of a storage apparatus. Storage apparatus 800 may be an illustrative example of at least a portion of storage apparatus 100, storage apparatus 200, and/or storage apparatus 300.

Storage apparatus 800 includes slip-resistant foot 802 implemented on bottom surface 804 of a formed tray. Slip-resistant foot 802 may be an illustrative example of slip-resistant foot 702 in FIG. 7.

Figure 9:
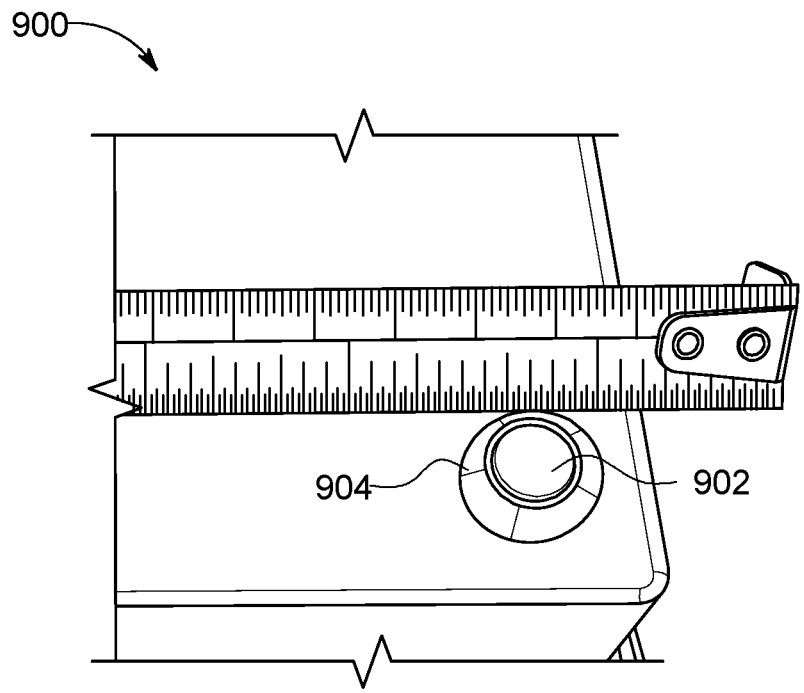
FIG. 9 is a block diagram illustrating an example exploded bottom perspective view of an individual foot of a storage apparatus.

FIG. 9 is a block diagram illustrating an example exploded bottom perspective view of an individual foot of a storage apparatus. Storage apparatus 900 may be an illustrative example of at least a portion of storage apparatus 100, storage apparatus 200, and/or storage apparatus 300.

Storage apparatus 900 includes slip-resistant foot 902 implemented a well 904 formed on a bottom surface a tray. Slip-resistant foot 902 may be an illustrative example of slip-resistant foot 702 in FIG. 7. Storage apparatus 900 depicts one example dimension of slip-resistant foot 902 having an approximate diameter of a half inch (0.5"), and a well 904 having an approximate outer diameter of three-fourths of an inch (0.75") and an approximate inner diameter of a half inch (0.5") to accommodate the size of slip-resistant foot 902.

Figure 10:
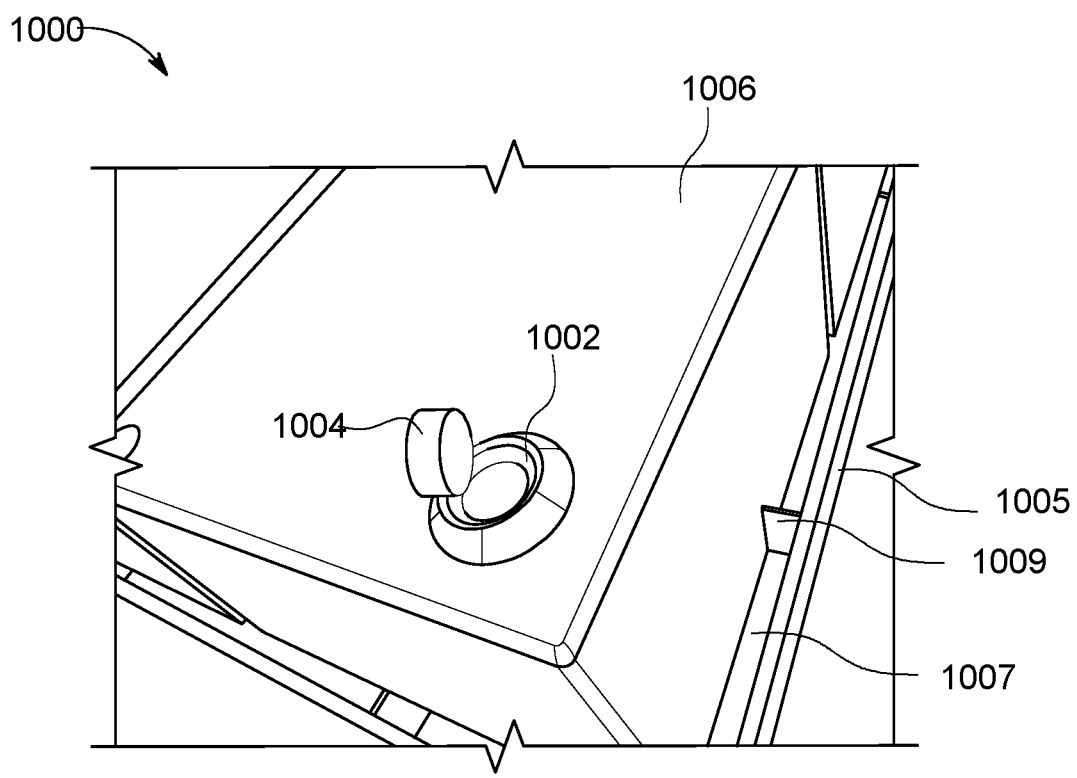
FIG. 10 is a block diagram illustrating an example exploded bottom perspective view of an individual foot application onto a storage apparatus.

FIG. 10 is a block diagram illustrating an example exploded isometric bottom perspective view of an individual foot application onto a storage apparatus. Storage apparatus 1000 may be an illustrative example of at least a portion of storage apparatus 100, storage apparatus 200, and/or storage apparatus 300. Storage apparatu 1000 includes upper lip 1005, which is an exterior lip that circumferences the perimeter of storage apparatus 1000. A space 1007 is formed by virtue of two opposing parallel surfaces, which in this exampl is the lip 1005 and the wall of the cell. Truncated tab 1009 connect lip 1005 and the wall of the cell within space 1007.

Storage apparatus 1000 includes formed well 1002, slip-resistant foot 1004 and bottom surface 1006. Storage apparatus 1000 depicts one example application of slip-resistant foot 1004 after storage apparatus 1000 is formed, including the pre-formed well 1002 to accommodate slip-resistant foot 1004.

Figure 11:
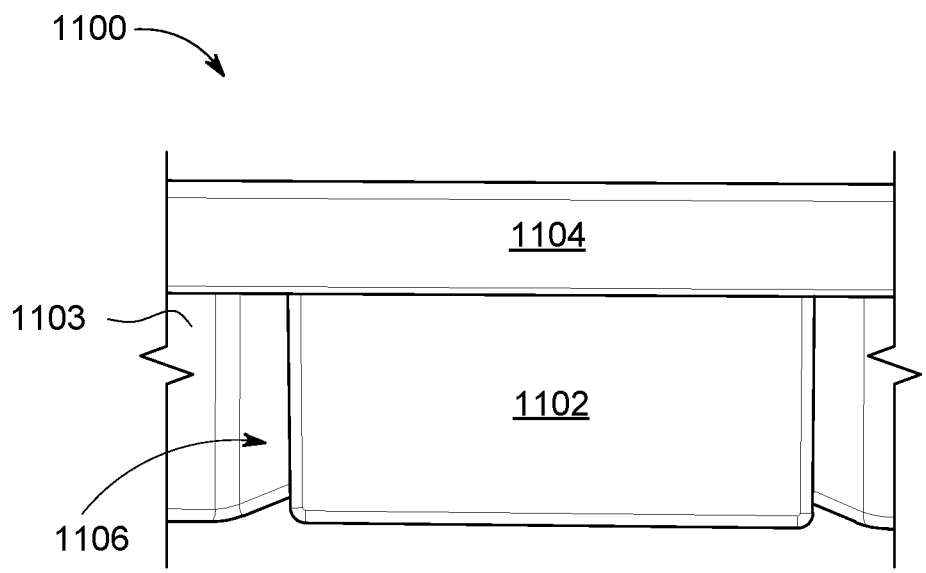
FIG. 11 is a block diagram illustrating an example exploded side perspective view of an individual cell of a storage apparatus.

FIG. 11 is a block diagram illustrating an example exploded side perspective view of an individual cell of a storage apparatus. Storage apparatus 1100 may be an illustrative example of at least a portion of storage apparatus 100, storage apparatus 200, and/or storage apparatus 300.

Storage apparatus 1100 includes individual wall 1102, lip 1104, space 1106, and second wall 1103. Space 1106 is formed by virtue of two opposing parallel formed walls connected at one end to provide continuity of the tray structure between the separate cells.

Figure 12:
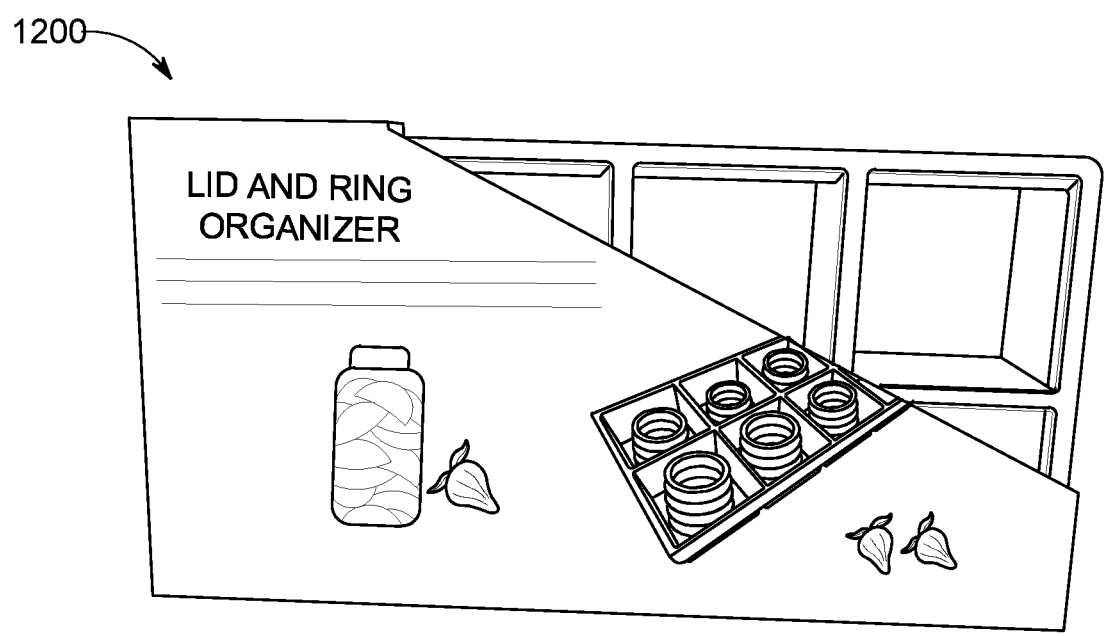
FIG. 12 is a block diagram illustrating an example perspective view of a storage apparatus.

FIG. 12 is a block diagram illustrating an example perspective view of a storage apparatus. Storage apparatus 1200 may be an illustrative example of at least a portion of storage apparatus 100, storage apparatus 200, and/or storage apparatus 300. In this example, storage apparatus 1200 is a substantially rigid, formed tray having eight individual cells, the eight individual cells configured to provide eight separate storage compartments for canning equipment, the storage apparatus having a height, width, and depth configured for implementation within a standard sized kitchen cabinetry drawer.

Figure 13:
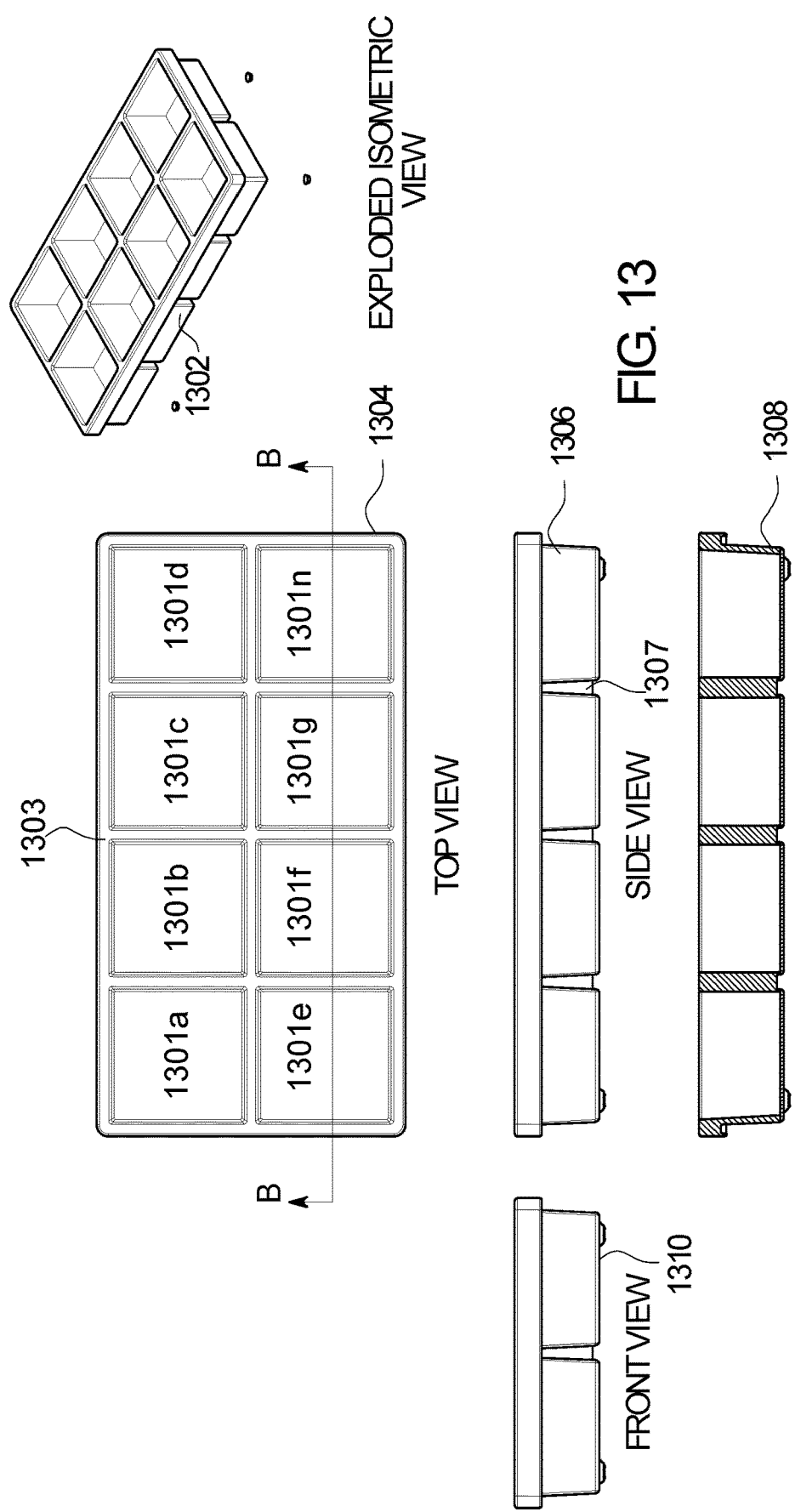
FIG. 13 is a block diagram illustrating example perspective views of a storage apparatus.

FIG. 13 is a block diagram illustrating example perspective views of a storage apparatus. The example perspective views illustrated in FIG. 13 may be illustrative example of different angles or perspectives of storage apparatus 100, storage apparatus 200, and/or storage apparatus 300.

Isometric view 1302 provides an angled perspective of a storage apparatus having eight cells or storage compartments. Top view 1304 provides a top perspective view of a storage apparatus having eight cells or storage compartments (1301a-1301n). Top view 1304 also provides a top perspective view of upper coupling surface 1303, which couples the upper portion of the cells. Side view 1306 provides a perspective view of a storage apparatus including a lip around the outer top wall structure of the formed tray and tab 1307 connecting two respective cells. Side view 1308 provides a perspective view of a storage apparatus without a lip around the outer top wall structure of the formed tray. Side view 1310 provides a perspective view of another side of a storage apparatus including the lip. In these examples, side view 1306 may be a perspective view of a longer side of the formed tray, while side view 1310 may be a perspective view of a shorter side of the formed tray, where the tray is substantially rectangular in shape.

Figure 14:
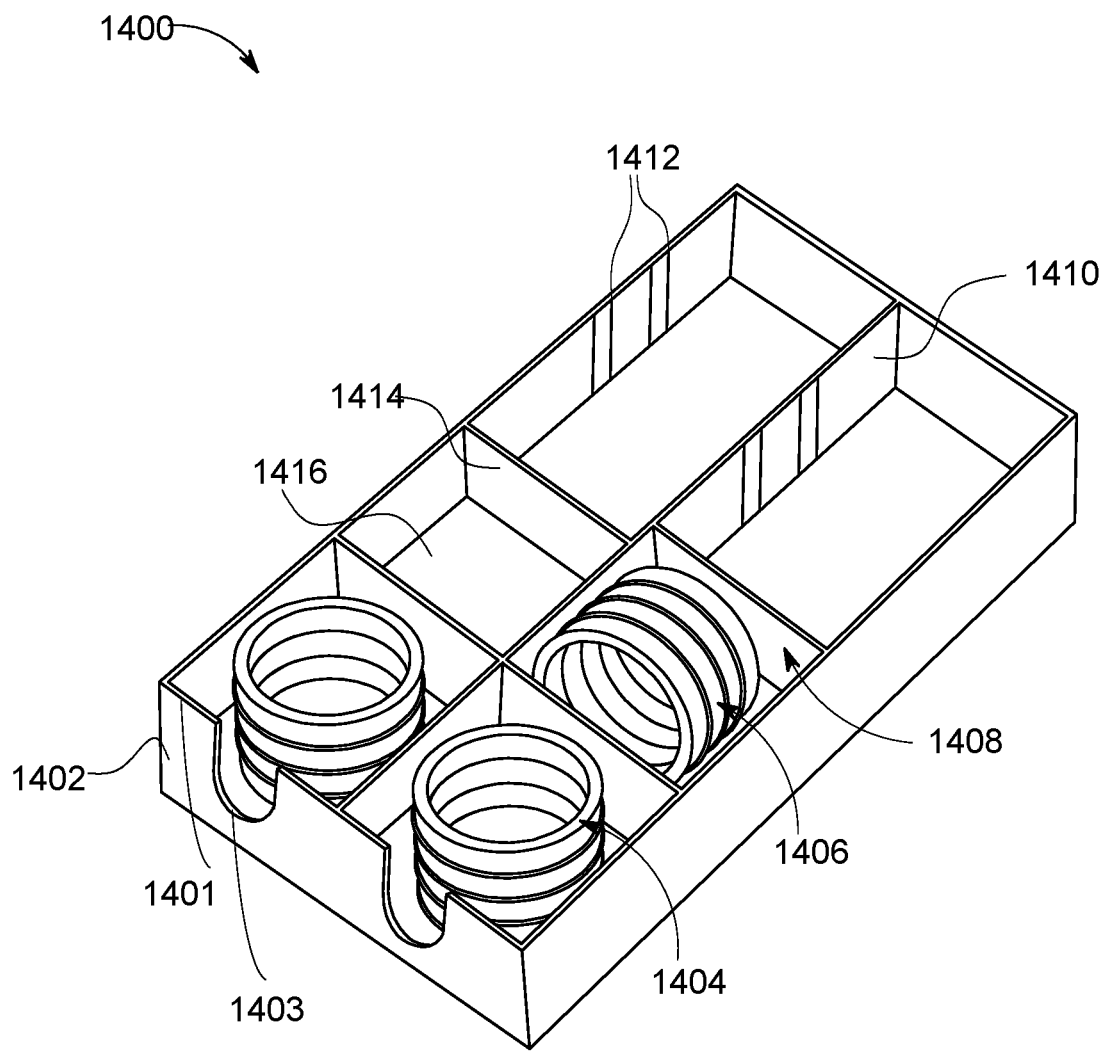
FIG. 14 is a block diagram illustrating an example modular storage apparatus.

FIG. 14 is a block diagram illustrating an example modular storage apparatus. Modular storage apparatus 1400 may be an illustrative example of one implementation of storage apparatus 100 and/or storage apparatus 200 in FIGS. 1 & 2.

Modular storage apparatus 1400 includes recessed wall 1402, individual cell 1401, individual cell 1406, divider 1408, divider 1410, slots 1412, divider 14114, and individual cell 1416. In this illustrative example, recessed wall 1402 may a wall having a formed opening providing a recessed portion wall to allow additional access to the one or more cells relative to access provided by one or more other walls that are not recessed or do not include a recessed portion. In this example, the recessed portion shows a variable height including an apex height 1401 and a nadir height 1403. In these examples, one or more cells of the plurality of cells of storage apparatus 1400 may include at least one recessed wall of the four walls that form an individual cell. The recessed wall may be at least one of the outer walls of the four walls that form the individual cell relative to the formed tray. In other words, the outer perimeter of the formed tray may include at least one wall of each cell implemented in the tray.

In this example, recessed wall is depicted as a u-shaped cutout in one of the four walls that comprise an individual cell. However, this illustration is not intended to limit the scope of the disclosure in any way. Any manner of shape and/or size recess may be used to provide additional access into an individual cell via one or more walls of the cell.

Further, the illustrative example of two recessed walls depicted for modular storage apparatus 1400 does not limit the scope of this disclosure in any way. Any number of recessed walls may be implemented in modular storage apparatus 1400. In other examples, recessed wall 1402 may be an optional component of modular storage apparatus 1400. Modular storage apparatus 1400 may also include zero recessed walls in some examples.

Individual cell 1404 provides an illustrative example of a storage compartment of a tray, such as modular storage apparatus 1400, providing an adjustable sized cell for containment and storage of one or more items. In this illustrative example, a stack of canning lids is stored within individual cell 1404. Individual cell 1406 provides another illustrative example of a storage compartment of a tray providing an adjustable sized cell for containment and storage of one or more items. In this example, individual cell 1406 is modified and/or adjusted to provide a different sized compartment than that of individual cell 1404. In this illustrative example, a row of canning rings is stored within individual cell 1406.

Divider 1408 is an illustrative example of a removeable divider that serves as at least one wall of the four walls that form an individual cell. In this example, divider 1408 is one wall of the four walls that form individual cell 1406. Divider 1410 is a stationary or fixed divider that is implemented lengthwise from one end of the tray to the other end of the tray provided by modular storage apparatus 1400. Slots 1412 represent two illustrative slots disposed along an outer wall of the tray provided by modular storage apparatus 1400. In this example, parallel slots may be implemented along divider 1410 that mirror the position and/or location of slots 1412, such that a removeable divider, like that of divider 1408 for example, may be inserted into two opposing parallel slots to form a wall structure. Divider 1408 may be held or otherwise supported by one slot along one face of divider 1410 and another slot along an interior face or portion of the outer wall that forms one of the corners of individual cell 1406. Divider 1408 may be removed from the slots that provide placement for divider 1408 as one wall of the four walls composing individual cell 1406, and may be relocated at another position within modular storage apparatus 1400 using one or more slots, to form another wall of another individual cell, for example. In this way, each of the individual cells of modular storage apparatus 1400 may be modifiable in size to accommodate one or more sizes of items.

Divider 1414 is another example of a removeable divider similar to divider 1408. Divider 1414 provides one wall of the four walls that compose individual cell 1416 in this example. As depicted, divider 1414 is disposed between two opposing parallel slots in such a position as to provide a smaller size for individual cell 1416 than the size provided by individual cell 1406 based at least in part on the placement of divider 1408.

Although only four slots are depicted in modular storage apparatus 1400, as illustrated by slots 1412 and other slots along divider 1410, the illustration provided herein is not intended to limit aspects of this disclosure. Any number of slots may be implemented along one or more walls of storage apparatus 1400 and/or divider 1410. Any suitable number, spacing, and/or configuration of the one or more slots implemented in the modular storage application may be used within the spirit of this disclosure. Additionally, any suitable number of removable dividers and/or stationary dividers may be implemented in modular storage apparatus 1400.

Figure 15:
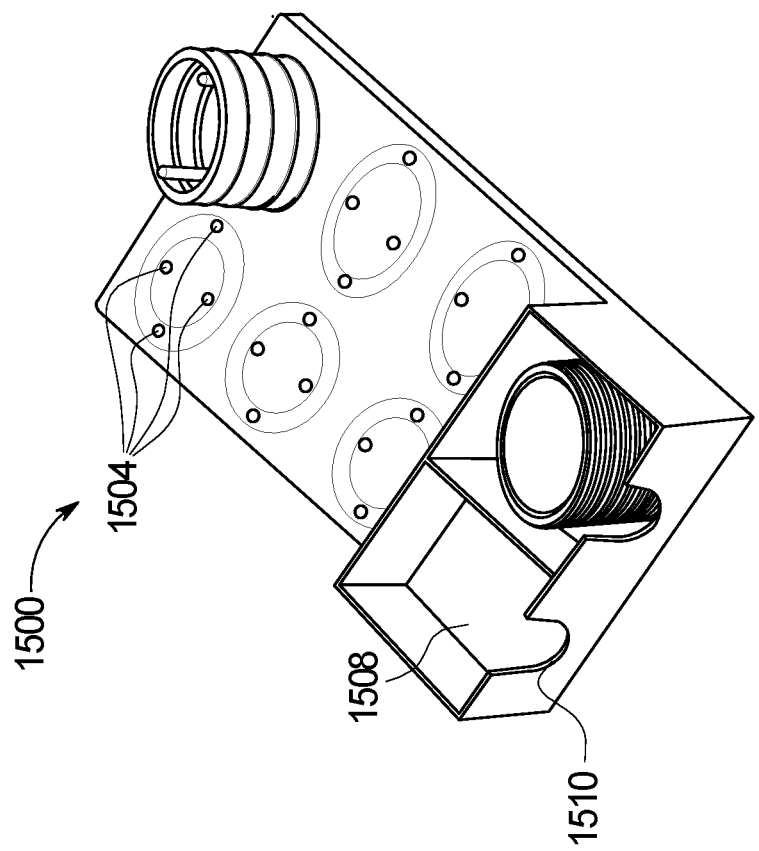
FIG. 15 is a block diagram illustrating an example modular storage apparatus.
Figure 15:
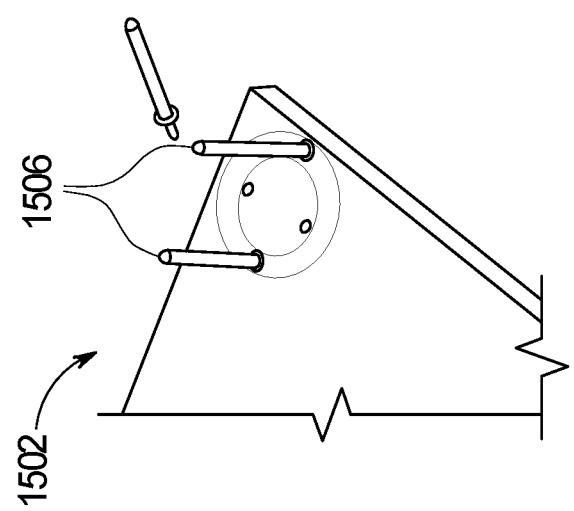

FIG. 15 is a block diagram illustrating an example modular storage apparatus. Modular storage apparatus 1500 is an exemplary implementation of a substantially rigid, formed tray having a plurality of cells and a plurality of pegs. The plurality of cells is configured to provide separate storage compartments, or cells. The plurality of pegs is configured to provide a surface around which an item may be placed.

Storage apparatus 1500 has a height, width, and depth configured for implementation within a standard sized cabinetry drawer, such as a kitchen drawer for example. In one implementation, the dimensions of storage apparatus 1500 may be 16.5 inches width (W)×2.7 inches height (H)×7 inches depth (D) (16.5"(W)×2.7" (H)×7"(D)) or 420 mm (W)×180 mm (D)×70 mm (H). In other examples, the dimensions may have varying ranges of height, width, and/or depth while still providing overall dimensions that allow for insertion of the storage apparatus into a standard sized drawer. In these examples, a standard sized drawer includes any cabinet drawer assembled according to standard sizes in the industry. Although the dimensions of storage apparatus 1500 may be configured for insertion or implementation within a drawer, storage apparatus 1500 is not limited to use within a drawer. Storage apparatus 1500 may be implemented anywhere that containment and organization of items is desired, including without limitation, a shelf, cabinet, counter, closet, or any other suitable location.

Modular storage apparatus 1500, as depicted in this example, includes an exploded perspective view 1502 of at least a portion of storage apparatus 1500. Storage apparatus 1500 includes a number of holes disposed across a portion of the top surface of the substantially rigid, formed tray, and a number of storage compartments disposed across a portion of the top surface of the tray. In this illustrative example, modular storage apparatus 1500 depicts a plurality of sets of holes, such as hole set 1504, disposed across one end of the tray, with a plurality of individual cells, such as cell 1508, disposed across an opposing end of the tray from the sets of holes.

As depicted in the exploded view 1502, removable pegs 1506 are inserted into one or more of the holes in a set of holes, such as hole set 1504, to provide a peg structure that supports an interior diameter of a ring, such as a canning ring for example. The removable pegs 1506 may be inserted into any hold in the number of holes disposed across the top surface of the tray to modify the placement and size of one or more peg structures on the tray in order to accommodate varying numbers and/or sizes of items. In one illustrative example, a set of holes, such as hole set 1504, may offer two discreet peg structure sizes by virtue of the spacing and location of the opposing parallel holes. For example, using cardinal direction terms for illustrative purposes only, if two removable pegs are inserted into a north and south hole of hole set 1504, the resulting peg structure may accommodate a diameter range up to one specific minimum diameter, while inserting two removable pegs into a east and west hole of hole set 1504 may result in a peg structure that accommodates a different diameter range.

Modular storage apparatus 1500 may include a plurality of pegs implemented in discrete intervals across a portion of the substantially rigid, formed tray. Each peg in the plurality of pegs may be implemented at a location relative to another location of another peg in the plurality of pegs, such that at least two pegs in the plurality of pegs are spaced relative to each other to accommodate a diameter of a storage item and provide a peg structure.

The plurality of cells or storage compartments offering separate storage slots for items may be sized to accommodate specific items as well. In the illustrative example, the plurality of cells of modular storage apparatus 1500 are fixed in size, however in other examples, the plurality of cells may be partially or fully adjustable. In this example, individual cell 1508 includes a recessed wall 1510, which may be an illustrative example of recessed wall 1402 in FIG. 14.

Modular storage apparatus 1500 may include a plurality of cells implemented on at least a portion of the substantially rigid, formed tray. The plurality of cells may comprise four walls and a floor surface perpendicularly adjacent to the four walls, providing an opening parallel from the floor surface. In some examples, one or more walls of the four walls that compose an individual cell may include a recessed portion. A recessed wall, or a wall having a recessed portion, may include a formed opening, such that the at least one recessed wall provides additional access to the one or more cells relative to access provided by other walls that are not recessed or do not include a recessed portion.

In one example, modular storage apparatus 1500 may be a storage tray for use in organizing and storing canning equipment, such as lids and rings associated with canning jars, and may include cells that are sized to accommodate the dimensions of standard sized canning lids with a modular peg and hole configuration to accommodate the diameter(s) of canning rings.

In some examples, the cells of modular storage apparatus 1500 are configured to provide equally sized compartments. In other examples, the cells of modular storage apparatus 1500 are configured to provide varying sized compartments.

Modular storage apparatus 1500 in these examples is a formed tray, having substantial rigidity to maintain shape and function of providing separate storage compartments for containment and storage of one or more items. Modular storage apparatus 1500 may be configured using any type of material, including, without limitation, injection molded plastic, polypropylene, acrylic, wood, metal, or any other suitable material. In some examples, an additional coating material may be applied over the material used to form the tray, such as a sealant and/or protectant. A coating material applied to a surface of the substantially rigid formed tray may provide a moisture barrier for a material of the substantially rigid formed tray in these examples.

In one example, modular storage apparatus 1500 is comprised of injection molded plastic that is BPA-free to meet Federal guidelines for food safety. In this example, modular storage apparatus 1500 is dishwasher safe, and may be comprised of a material that is mold-resistant and/or bacteria-resistant. This provides a storage tray that is easily cleaned and safe for use with food-related items. In another example, modular storage apparatus 1500 is comprised of injection molded polypropylene, which may also be dishwasher safe as well as including other properties to provide durability.

In another example, modular storage apparatus 1500 is comprised of a wood material and may further include a coating, sealant, and/or protectant layer over the surface of the wood material that provides water resistance. For example, a polyurethane coating may be applied to seal the wood material of the tray.

In still another example, modular storage apparatus 1500 is comprised of a metal material and may further include a coating, sealant, and/or protectant layer or finish over the surface of the metal material that provides water resistance and/or rust resistance. For example, a powder coating or clear coat protectant may be used, which may also provide a tray that is dishwasher safe in some examples.

Modular storage apparatus 1500 may further include one or more feet disposed and/or affixed along a bottom surface of the tray. The one or more feet may provide a slip resistance property to modular storage apparatus 1500, providing resistance to movement along or across a surface on which modular storage apparatus 1500 is implemented. In some examples, the one or more feet may be comprised of a rubber or rubberized material and affixed to the bottom surface of the tray after the tray is formed or molded. In other examples, the one or more feet may be implemented as protrusions of the material used to from the tray along the bottom surface of the tray and may be configured during the molding process of the material. For example, the tray may be comprised of a substantially rigid rubberized plastic that provides slip resistance by virtue of the nature of the material used to form the tray.

Figure 16:
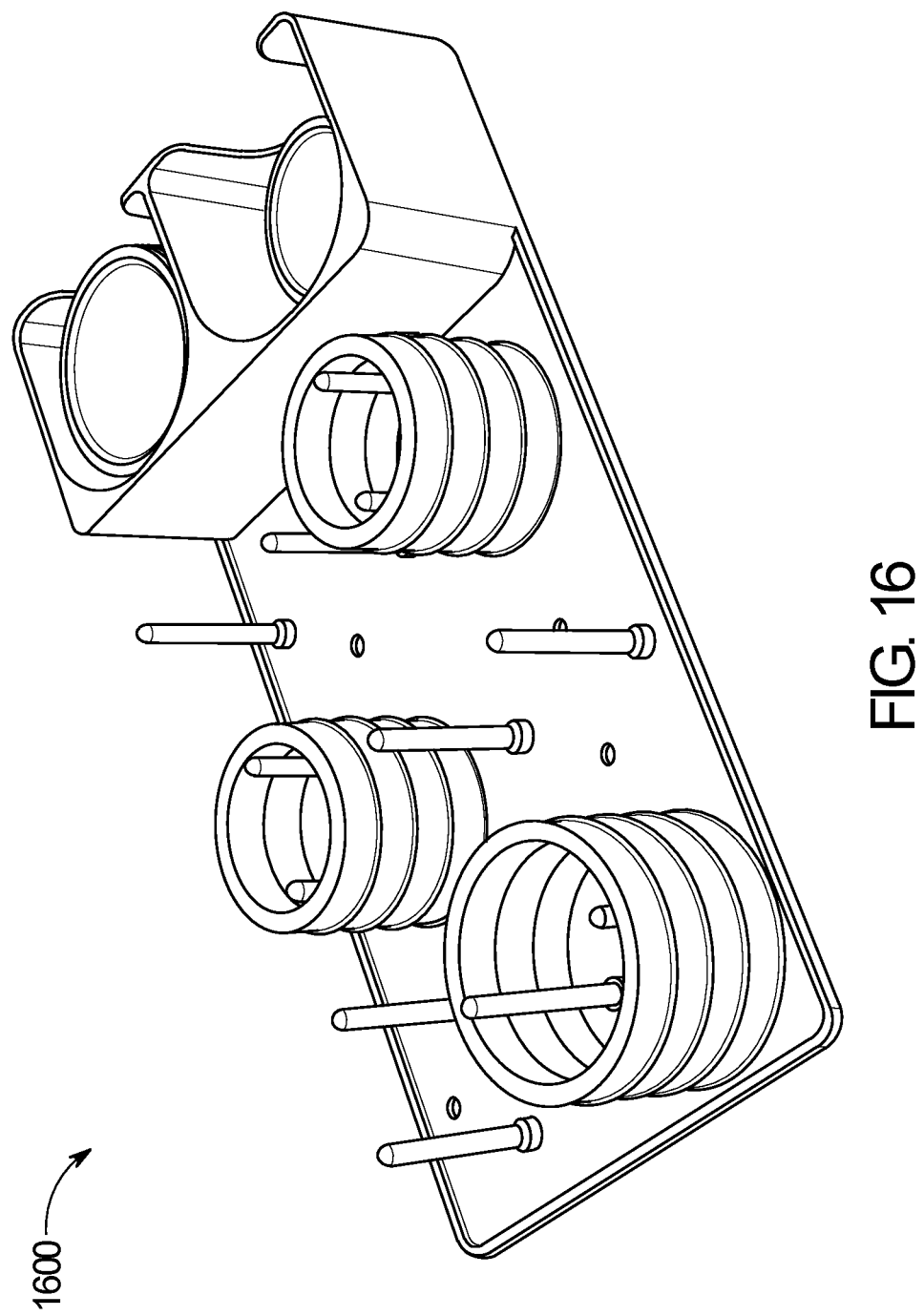
FIG. 16 is a block diagram illustrating an example modular storage apparatus.

FIG. 16 is a block diagram illustrating an example modular storage apparatus. Modular storage apparatus 1600 is an isometric perspective view of one implementation of modular storage apparatus 1500. In this illustrative example, modular storage apparatus 1600 may be sized to accommodate storage of canning equipment.

Figure 17:
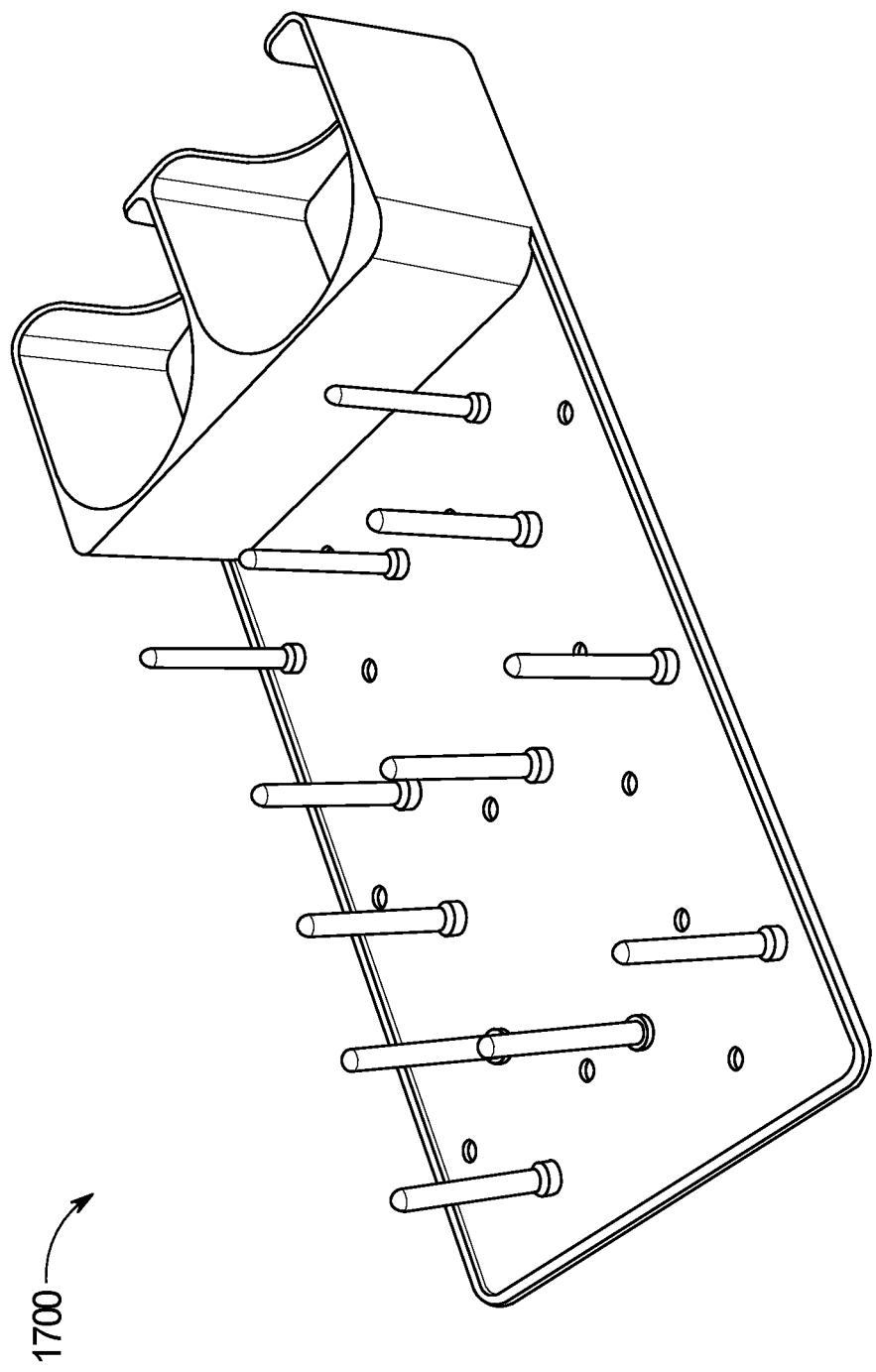
FIG. 17 is a block diagram illustrating an example modular storage apparatus.

FIG. 17 is a block diagram illustrating an example modular storage apparatus. Modular storage apparatus 1700 is an isometric perspective view of one implementation of modular storage apparatus 1500.

Figure 18:
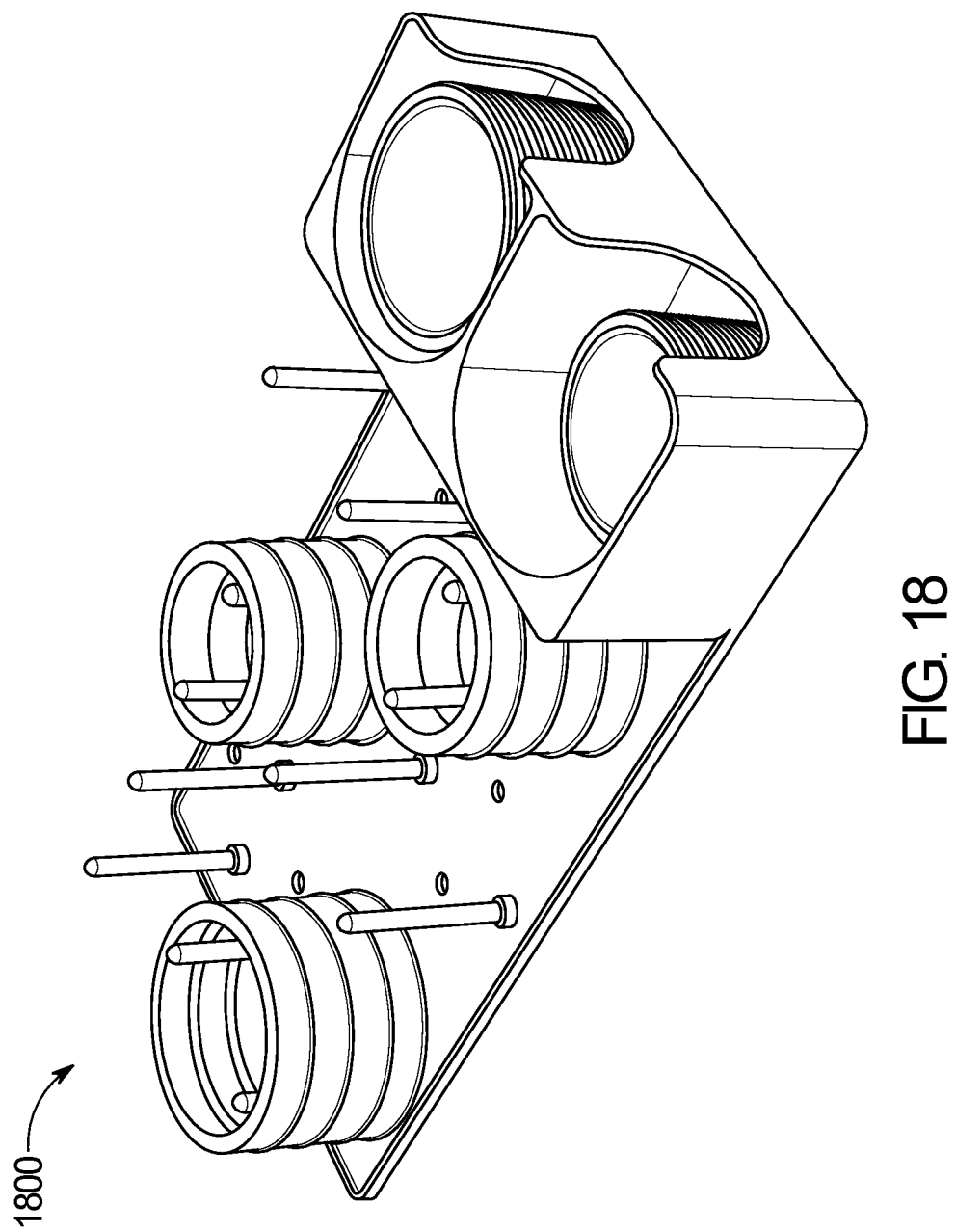
FIG. 18 is a block diagram illustrating an example modular storage apparatus.

FIG. 18 is a block diagram illustrating an example modular storage apparatus. Modular storage apparatus 1800 is an isometric perspective view of one implementation of modular storage apparatus 1500.

Figure 19:
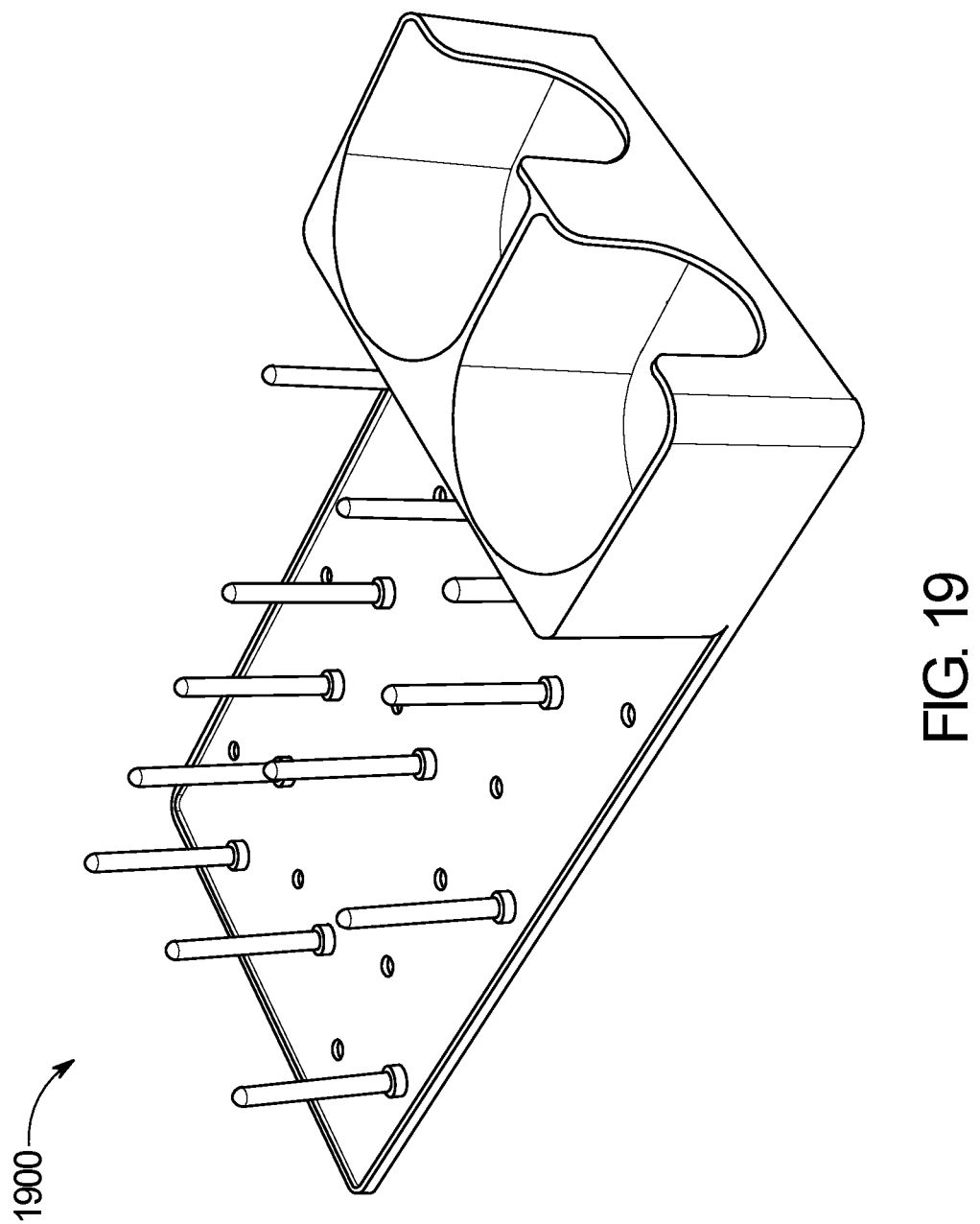
FIG. 19 is a block diagram illustrating an example modular storage apparatus.

FIG. 19 is a block diagram illustrating an example modular storage apparatus. Modular storage apparatus 1900 is an isometric perspective view of one implementation of modular storage apparatus 1500.

Alternatively, or in addition to the other examples described herein, examples include any combination of the following:
  wherein the substantially rigid formed tray comprises injection-molded plastic;
  wherein the substantially rigid formed tray comprises an acrylic material;
  wherein the substantially rigid formed tray comprises wood;
  wherein the substantially rigid formed tray comprises a metallic material;
  a plurality of slip-resistant feet affixed to a bottom portion of the substantially rigid formed tray;
  wherein at least one wall of the four walls of an individual cell in the plurality of cells is moveable, such that the individual cell size is modifiable;

wherein one or more cells of the plurality of cells comprises at least one recessed wall of the four walls, the at least one recessed wall having a formed opening such that the at least one recessed wall provides additional access to the one or more cells relative to access provided by the one or more other walls other than the at least one recessed wall;

a coating material applied to a surface of the substantially rigid formed tray, the coating material providing a moisture barrier for a material of the substantially rigid formed tray;

wherein the plurality of pegs is implemented in discrete intervals across a portion of the substantially rigid, formed tray, each peg in the plurality of pegs implemented at a location relative to another location of another peg in the plurality of pegs, such that at least two pegs in the plurality of pegs are spaced relative to each other to accommodate a diameter of a storage item;

wherein the plurality of cells is implemented on at least a portion of the substantially rigid, formed tray, and wherein the plurality of cells each comprise four walls and a floor surface perpendicularly adjacent to the four walls, providing an opening parallel from the floor surface;

wherein one or more cells of the plurality of cells comprises at least one recessed wall of the four walls, the at least one recessed wall having a formed opening such that the at least one recessed wall provides additional access to the one or more cells relative to access provided by the one or more other walls other than the at least one recessed wall;

wherein the eight individual cells are configured to accommodate a diameter of standard-sized wide-mouth canning rings and canning lids;

wherein the eight individual cells are configured to provide equally sized compartments;

a coating material applied to a surface of the substantially rigid formed tray, the coating material providing a moisture barrier for a material of the substantially rigid formed tray;

wherein eight individual cells each comprise four walls and a floor surface perpendicularly adjacent to the four walls, providing an opening parallel from the floor surface;

a plurality of slip-resistant feet affixed to a bottom portion of the substantially rigid, formed tray.

While the aspects of the disclosure have been described in terms of various examples with their associated functions, a person skilled in the art would appreciate that a combination of functions from any number of different examples is also within scope of the aspects of the disclosure.

When introducing elements of aspects of the disclosure or the examples thereof, the articles "a," "an," "the,"" and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A substantially rigid storage apparatus comprising:
a plurality of cells, the plurality of cells configured to provide separate storage compartments, each cell of the sotrage apparatus configured to provide equally sized compartments, wherein each cell comprises four walls of equal height and a floor surface perpendicularly adjacent to the four walls, providing an opening parallel from the floor surface;
a tab located within a space, the space having an elongated portion between a first wall of one cell of the plurality of cells and a second wall of a second cell of the plurality of cells, the tab coupling the first wall to the second wall, the tab comprising:
an elongated portion extending in a direction parallel to the first wall, parallel to the second wall, and perpendicular to the floor surface, wherein the elongated portion couples the first wall to the second wall, and
a truncated portion extending in a direction perpendicular to the first wall, perpendicular to the second wall, the truncated portion being located distal the floor surface, and the truncated portion having a flat floor facing edge that is parallel the floor surface,
wherein the elongated portion of the space is longer than the elongated portion of the tab; and
one or more exterior cells of the plurality of cells comprises a recessed portion within one exterior wall of the four walls, the recessed portion having a variable height, wherein an apex of the variable height is equal to an apex height of the four walls and a nadir of the variable height is less than the apex height of the four walls, the recessed portion provides additional access to an interior portion of a given exterior cell of the one or more exterior cells relative to access provided by three un-recessed walls of the four walls.

2. The storage apparatus of claim 1 further comprising injection-molded plastic.

3. The storage apparatus of claim 1 further comprising an acrylic material.

4. The storage apparatus of claim 1 further comprising wood.

5. The storage apparatus of claim 1 further comprising a metallic material.

6. The storage apparatus of claim 1, further comprising:
a slip-resistant foot affixed to a bottom portion of one or more of the plurality of cells.

7. The storage apparatus of claim 1, further comprising:
a coating material applied to a surface of the plurality of cells, the coating material providing a moisture barrier for a material of the plurality of cells.

8. The substantially rigid storage apparatus of claim 1 further comprising an upper coupling surface, the upper coupling surface coupling the first wall to the second wall, and the upper coupling surface oriented parallel to the floor surface and oriented perpendicular to the first wall and the second wall.

9. A substantially rigid storage apparatus comprising:
a plurality of cells, the plurality of cells configured to provide separate storage compartments, each cell of the storage apparatus configured to provide equally sized compartments, wherein each cell comprises four walls of equal height and a floor surface perpendicularly adjacent to the four walls;
a tab located within a space between a first wall of a first cell of the plurality of cells and a second wall of a second cell of the plurality of cells, the tab coupling the first wall to the second wall distal the floor surface of the first cell and the second cell, the tab having a flat edge facing the floor surface that is parallel the floor surface, wherein the space has an elongated portion extending in a direction parallel to the first wall, parallel to the second wall, and perpendicular to the floor surface of the first cell and the second cell, the space having a truncated portion extending in a direction perpendicular to the first wall, perpendicular to the second wall, and parallel to the floor surface of the first cell and the second cell; and
an upper lip encircling an upper perimeter of the storage apparatus, the upper lip extending parallel to the first wall and the second wall, the upper lip is located distal to the floor surface of the first cell and the second cell, and the upper lip having a flat surface that is parallel the floor surface.

10. The substantially rigid sotrage apparatus of claim 9, wherein one or more cells of the plurality of cells comprises a recessed portion within one wall of the four walls, the recessed portion having a variable height, wherein an apex of the variable height is equal to an apex height of the four walls and a nadir of the variable height is less than the apex height of the four walls, the recessed portion provides additional access to an interior portion of a given cell of the one or more cells relative to acess provided by three un-recessed walls of the four walls.

11. The substantially rigid storage apparatus of claim 9 further comprising an upper coupling surface, the upper coupling surface coupling the first wall to the second wall, the upper coupling surface coupling the first wall to the upper lip, the upper coupling surface oriented parallel to the floor surface and oriented perpendicular to the first wall and the second wall.

12. the substantially rigid storage apparatus of claim 9 further comprising a plurality of truncated tabs, each truncated tab configured to couple a wall of the four walls to the upper lip, wherein the truncated tab is located within a gap between the upper lip and the wall, and wherein each cell omprises at least one truncated tab.

13. A substantially rigid storage apparatus comprising:
a plurality of cells, the plurality of cells configured to provide separate storage compartments, each cell of the storage apparatus configured to provide equally sized compartments, wherein each cell comprises four walls of equal height and a floor surface perpendicularly adjacent to the four walls;
a tab located within a space between a first wall of a first cell of the plurality of cells and a second wall of second cell of the plurality of cells, the tab coupling a first wall to a second wall, the tab being located distal the floor surface, and the tab having a flat edge facing the floor surface that is parallel the floor surface, the space having an elongated portion extending in a direction parallel to the first wall, parallel to the second wall, and perpendicular to a floor surface of the plurality of cells, the space having a truncated portion extending in a direction perpendicular to the first wall, perpendicular to the second wall, and parallel to the floor surface;
an exterior lip enclosing an upper perimeter of the storage apparauts, the upper perimeter having a flat surface that is parllel the floor surface, and the exterior lip extending parallel to the first wall and the second wall, the exterior lip is located distal to the floor surface of the first cell and the second cell, and the exterior lip having a flat surface that is parallel the floor surface; and
a plurality of truncated tabs, each truncated tab configured to couple a wall of the four walls to the exterior lip, wherein the truncated tab is located within a gap between the exterior lip and the wall, wherein the truncated tab has a flat edge facing the floor surface that is parallel the floor surface, and wherein each cell comprises at least one truncated tab.

14. The substantially rigid storage apparatus of claim 13, wherein the plurality of cells are configured to accommodate a diameter of standard-sized wide-mouth canning rings and canning lids.

15. The substantially rigid storage apparatus of claim 13, further comprising:
a coating material applied to a surface of the plurality of cells, the coating material providing a moisture barrier for a material of the plurality of cells.

16. The substantially rigid storage apparatus of claim 13, further comprising:
a plurality of slip-resistant feet affixed to a bottom portion of one or more of the plurality of cells.

17. The substantially rigid storage apparatus of claim 13 further comprising an upper coupling surface, the upper coupling surface coupling the first wall to the second wall, the upper coupling surface coupling the first wall to the exterior lip, the upper coupling surface oriented parallel to the floor surface and oriented perpendicular to the first wall and the second wall.

18. The substantially rigid storage apparatus of claim 13 further comprising a coating material applied to a surface of the plurality of cells, the coating material providing a moisture barrier for a material of the plurality of cells.

19. The storage apparatus of claim 13 further comprising injection-molded platic.

20. The storage apparatus of claim 13 further comprising an acrylic material.

* * * * *